(No Model.)

M. B. ALLEN.
FASTENING FOR FISHING TACKLE.

No. 527,259. Patented Oct. 9, 1894.

Witnesses.
F. M. Metcalf
G. W. Nichols

Inventor.
Manson B. Allen.
By Martin Metcalf.
Attorney.

THE NORRIS PETERS CO., PHOTO-LITHO., WASHINGTON, D. C.

UNITED STATES PATENT OFFICE.

MANSON B. ALLEN, OF BATTLE CREEK, MICHIGAN.

FASTENING FOR FISHING-TACKLE.

SPECIFICATION forming part of Letters Patent No. 527,259, dated October 9, 1894.

Application filed May 16, 1893. Serial No. 474,410. (No model.)

*To all whom it may concern:*

Be it known that I, MANSON B. ALLEN, a citizen of the United States, residing at Battle Creek, in the county of Calhoun and State of Michigan, have invented certain new and useful Improvements in Fastenings for Fishing-Tackle; and I do declare the following to be a full, clear, and exact description of the invention, such as will enable others skilled in the art to which it appertains to make and use the same, reference being had to the accompanying drawings, and to the letters of reference marked thereon, which form a part of this specification.

The objects of this invention are to provide means for the instant and secure removable attachment of the fish-hook to the line, whereby a hook of one kind or size can be readily exchanged for another kind or size; also to securely lock the swivel or bait in such a manner that the struggling fish on the hook cannot disengage the latter from the line or swivel; also, to automatically lock the hook to a trolling spoon, or other artificial bait, and also to so lock the hook, spoon or bait to the line or swivel, that either may be instantly exchanged for another size or kind; at the same time that all danger of the loss of a fish, or any portion of the fishing tackle, caused by the struggles of the fish to escape from the hook, is avoided. I accomplish these important results by means of the novel construction of a spring wire link, whereby the series of parts constituting the fishing-tackle, are automatically locked together in a manner so simple and effective that a mere inspection of the drawings forming part of this specification will render obvious to those skilled in the arts to which this invention appertains.

Figure 1:
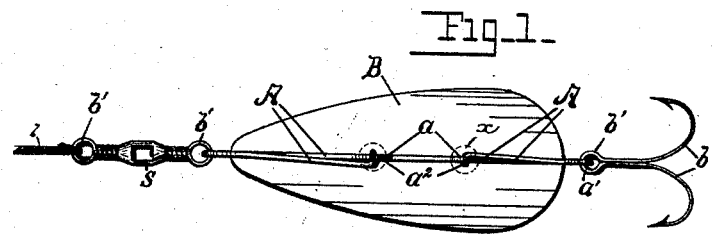
Figure 3:
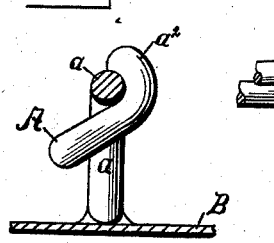
Figure 2:
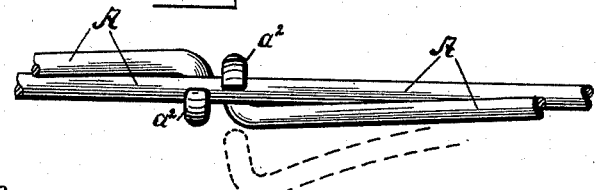
Figure 4:
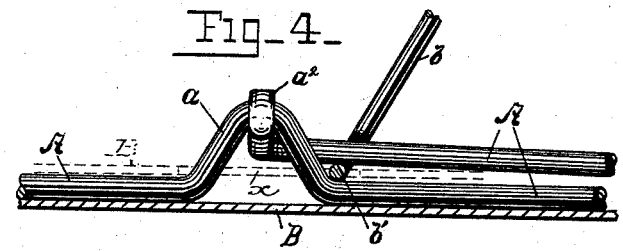

Referring to the drawings, wherein like letters designate like parts in all the views,—Figure 1. represents a plan view of my invention, as applied to the form of trolling spoon having a double fish-hook at one end thereof, and a swivel, for attachment of the line, at the other end thereof. Fig. 2. shows a similar view of the central portion of my device, detached and enlarged. Fig. 3. represents a transverse section—enlarged—and Fig. 4. is a side view, showing the manner in which the eye of the fish-hook, (or swivel, as the case may be,) automatically acts as a bolt, or lock, to prevent the disengagement of the means employed for the removable attachment of the hook, or swivel; in lieu of the insecure methods heretofore used, and which has been found to be unreliable when the fish caught by the hook struggles violently to escape.

Referring now more particularly to the letters of reference, A, represents my preferred form of link, as adapted to the trolling spoon, B, to which it is attached, as shown in Fig. 1.

The peculiarly novel construction of the link A, I will now proceed to describe, reference being had to the several views, 2, 3, and 4, for the purpose of more clearly to understand the novel office performed by the several parts as distinguished from spoon and other fishing tackle links heretofore employed.

The spring wire A, is bent at about its center, in the form of a loop $a$, of approximately inverted V-shape, thence extending, say, one-half the length of the "spoon," (more or less,) for which it is intended, where a semi-coil $a'$, is formed; from which point the wire returns toward the center, or loop $a$, approximately parallel with and closely adjacent to, but gradually ascending from the said semi-coil $a'$, until the central loop $a$, is reached, where a right angled upturned hook $a^2$, is formed for engagement with the said loop $a$. In forming this free end engagement, the returning portion, or free end thereof, in curving upwardly, also bends laterally, so as to closely and flexibly embrace the said loop $a$, and hold the free end and hook $a^2$ in its normal position for use.

To the unprofessional eye, the foregoing description may not appear as greatly differing from the spring clasps of many forms heretofore employed for like or similar purposes, save when the peculiar construction and novel action of the several parts are seen and understood, and to which we will now direct attention, as follows: In this construction and combination, the diameter of the wire of which the eye $b'$, of the fish-hook $b$, is formed should be of approximately equal diameter with the space between the free arm carrying the hook $a^2$, and the fixed portion beneath, carrying the loop $a$, of the link A. When these conditions exist, even approximately, the fish-hook eye $b'$, should the struggles of the fish caught, force the hook out of its place in the eye $a'$, and carry the hook toward its releasing loop $a$, forms an effective bar, bolt, or lock, whereby the disengagement of the one from the other, becomes an impossibility. (See Fig. 4.)

I have shown a double form of locking link A, in Figs. 1, and 2, which is preferred for use in connection with the trolling spoon; for the reason, among others, that the eye of the hook at one end of said spoon, and the eye of the swivel at the opposite end thereof, form identical locking devices for each, respectively, as is obvious. Nevertheless I do not confine myself to this, or to any other form, since a single loop and locking means substantially embodying my invention, may be made to answer a very good purpose.

By the means hereinbefore shown the fisherman is enabled to instantly exchange one kind or size of hook for another, detach or attach any one of the elements entering into the desired combination for the differing conditions for catching the various families of fishes, &c., without delay, or danger of losing any portions thereof, or of the fish hooked.

I have hereinbefore stated, that in the preferred form shown, the diameter of the wires composing the hook and swivel eyes, $b'$, should be approximately equal to the space between the fixed body portion and the free arm of the link A, to attain the most perfect safety; but when the V-shaped loop is properly proportioned to the engaging terminal hook, or clasp $a^2$, of the free arm of the link A, the eye $b'$, of the fish-hook $b$, (or eye of the swivel, as the case may be,) will suffice to securely lock the clasp, as is evident. (See Fig. 4.)

The spring link may be connected with the spoon in any suitable manner.

Having thus fully described and illustrated my invention, what I claim, and desire to secure by Letters Patent of the United States, is—

1. In a fishing tackle, the spoon, the hook provided with an eye and the spring wire link having a loop $a^2$ in its body portion projecting up from the spoon and a free hook extremity passing through the eye of the hook and engaging the loop over the surface of the spoon, substantially as described.

2. In a fishing tackle the spoon the hook provided with an eye, the swivel provided with an eye in combination with a spring wire link having two free hook extremities and two loops $a^2$ $a^2$ both projecting up from the surface of the spoon said free hook extremities engaging the loops $a^2$ and co-acting therewith to retain the hook and swivel, substantially as described.

In testimony whereof I affix my signature, in presence of two witnesses.

MANSON B. ALLEN.

Witnesses:
WILLIAM J. GARFIELD,
LOUIS J. ALLEN.